United States Patent [19]
Inoue et al.

[11] Patent Number: 5,623,580
[45] Date of Patent: Apr. 22, 1997

[54] PLANNING METHOD AND SYSTEM

[75] Inventors: Haruki Inoue, Katsuta; Hiroyuki Ichikawa, Iwaki; Hideo Yoshida, Takahagi; Yasuhiro Terada, Hitachi; Noboru Abe, Hitachi; Yoshiyuki Satoh, Hitachi; Masakazu Yahiro, Hitachi; Akemi Ohtsuki, Kiyose, all of Japan

[73] Assignees: Hitachi, Ltd., Tokyo; Hitachi Engineering Co., Ltd., Ibaraki-ken, both of Japan

[21] Appl. No.: 274,016

[22] Filed: Jul. 12, 1994

[30] Foreign Application Priority Data

Jul. 12, 1993 [JP] Japan .................................. 5-171765

[51] Int. Cl.$^6$ .................................................. G06F 15/18
[52] U.S. Cl. .................................................. 395/51; 395/50
[58] Field of Search ............................... 395/51, 50, 500; 364/401, 554

[56] References Cited

U.S. PATENT DOCUMENTS

| | | | |
|---|---|---|---|
| 4,797,839 | 1/1989 | Powell | 364/554 |
| 5,159,682 | 10/1992 | Toyonaga et al. | 395/500 |
| 5,195,172 | 3/1993 | Elad et al. | 395/50 |
| 5,369,570 | 11/1994 | Parad | 364/401 |

FOREIGN PATENT DOCUMENTS

| | | |
|---|---|---|
| 1229360 | 9/1989 | Japan . |
| 2148353 | 6/1990 | Japan . |
| 2304587 | 12/1990 | Japan . |
| 424866 | 1/1992 | Japan . |
| 4160463 | 6/1992 | Japan . |

OTHER PUBLICATIONS

Asahi, Kagaku "Epoch–making Solution for 'Traveling Salesman Problem'–Marvelously Excellent Results Obtained By Utilizing Chaos" (Feb., 1993).

Maheshwari, A stochastic optimization algorithm based on Newton–type method, Proceedings of 28th IEEE conference on decision and control, pp. 904–906, Dec. 15, 1989.

Yan et al., Discrete optimization with estimation, Proceedings of the 28th IEEE conference on decision and control, pp. 2463–2468, Dec. 15, 1989.

Hasselfield et al., An automated method for least cost distribution planning, Conference papers 1989 power industry computer application conference, pp. 83–89, May 5, 1989.

*Primary Examiner*—Robert W. Downs
*Assistant Examiner*—Sanjiv Shah
*Attorney, Agent, or Firm*—Antonelli, Terry, Stout & Kraus, LLP

[57] ABSTRACT

A planning system for quickly forming the optimum plan for a given planning problem, includes a setting unit for accepting the given planning problem; an optimization unit for creating an objective function which expresses an item intended to be minimized or maximized in the planning problem, and for executing a process which minimizes or maximizes a value of the created objective function; a storage unit for storing therein, at least, constant values which are required for the optimizing process; and a display unit for displaying a processed result of the optimization unit. The optimization unit performs a first function of calculating a difference value between the values of the objective function assumed in a last formed plan and a newly formed plan, and performs a second function of comparing the difference value of the objective function with the constant value set in the storage unit, and then substituting the last formed plan by the newly formed plan and setting the latter as a candidate for an optimum plan, on condition that the difference value of the objective function is smaller than the constant value.

7 Claims, 12 Drawing Sheets

CASE OF X=(1,2,3,4,5,6,7,8,9,10)

| D(f,t) f\t | 0 | 1 | 2 | 3 | 4 | 5 | 6 | 7 | 8 | 9 | 10 |
|---|---|---|---|---|---|---|---|---|---|---|---|
| 0 |  | 19 | 29 | 51 | 81 | 36 | 58 | 16 | 64 | 48 | 24 |
| 1 | 19 |  | 17 | 43 | 73 | 35 | 42 | 23 | 64 | 53 | 37 |
| 2 | 29 | 17 |  | 23 | 53 | 18 | 25 | 18 | 45 | 39 | 32 |
| 3 | 51 | 43 | 23 |  | 27 | 14 | 21 | 32 | 23 | 27 | 39 |
| 4 | 81 | 73 | 53 | 27 |  | 41 | 38 | 61 | 24 | 43 | 64 |
| 5 | 36 | 35 | 18 | 14 | 41 |  | 34 | 16 | 25 | 26 | 21 |
| 6 | 58 | 42 | 25 | 21 | 38 | 34 |  | 45 | 47 | 51 | 56 |
| 7 | 16 | 23 | 18 | 32 | 61 | 16 | 45 |  | 43 | 28 | 11 |
| 8 | 64 | 64 | 45 | 23 | 24 | 25 | 47 | 43 |  | 12 | 41 |
| 9 | 48 | 53 | 39 | 27 | 43 | 26 | 51 | 28 | 12 |  | 22 |
| 10 | 24 | 37 | 32 | 39 | 64 | 21 | 56 | 11 | 41 | 22 |  |

FIG. 4
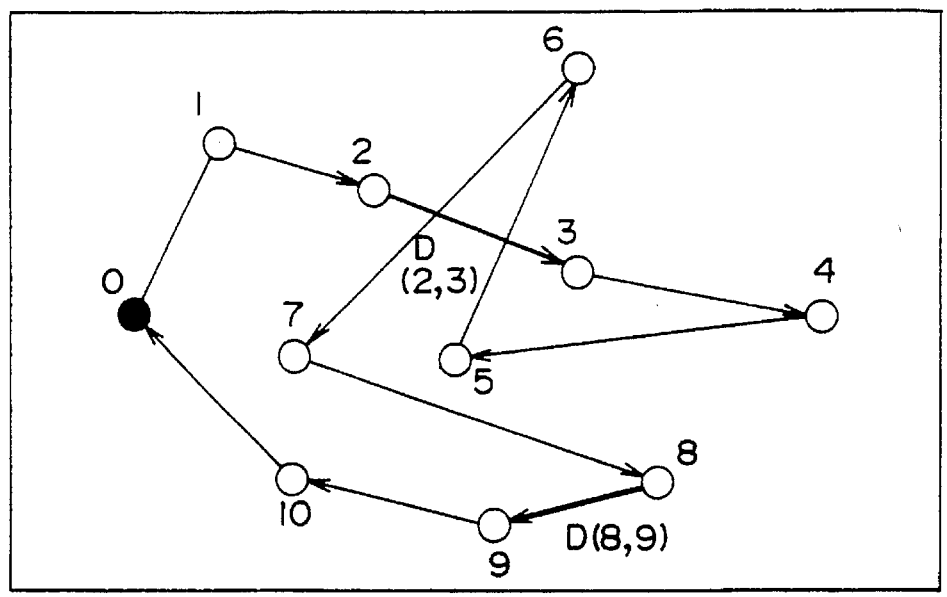
CASE OF X=(1,2,3,4,5,6,7,8,9,10)
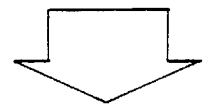
j    k
CASE OF Y=(1,2,8,7,6,5,4,3,9,10)
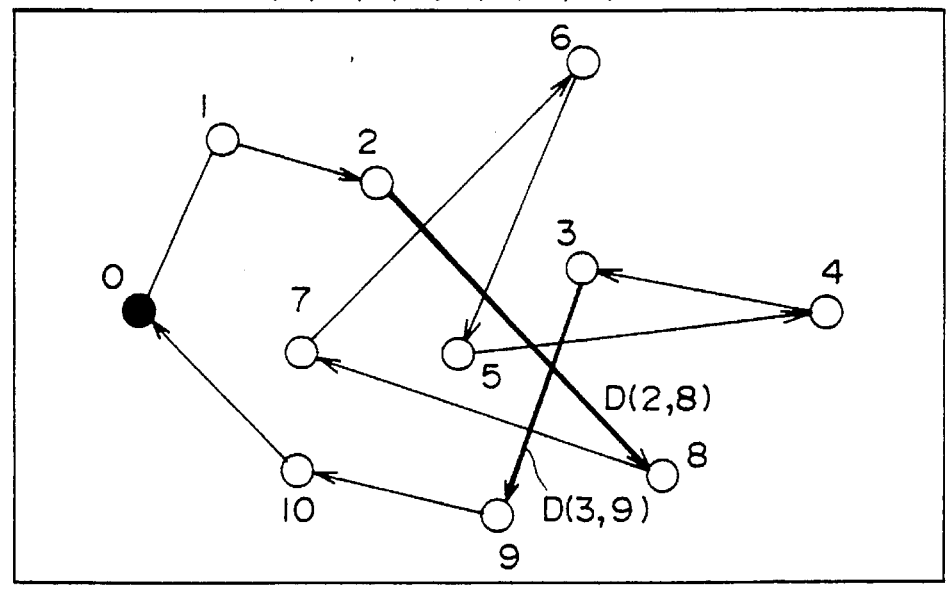

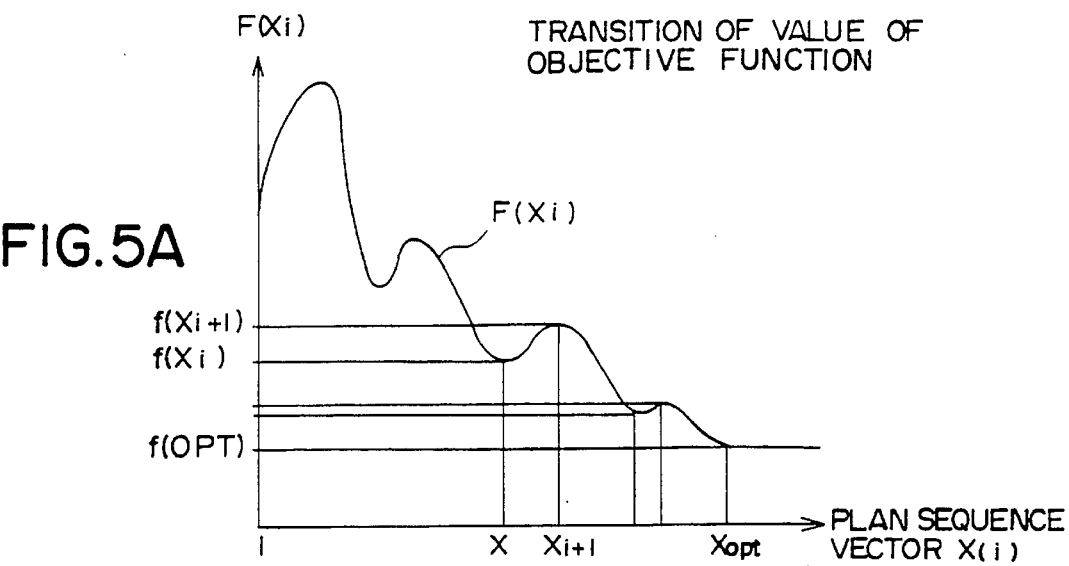
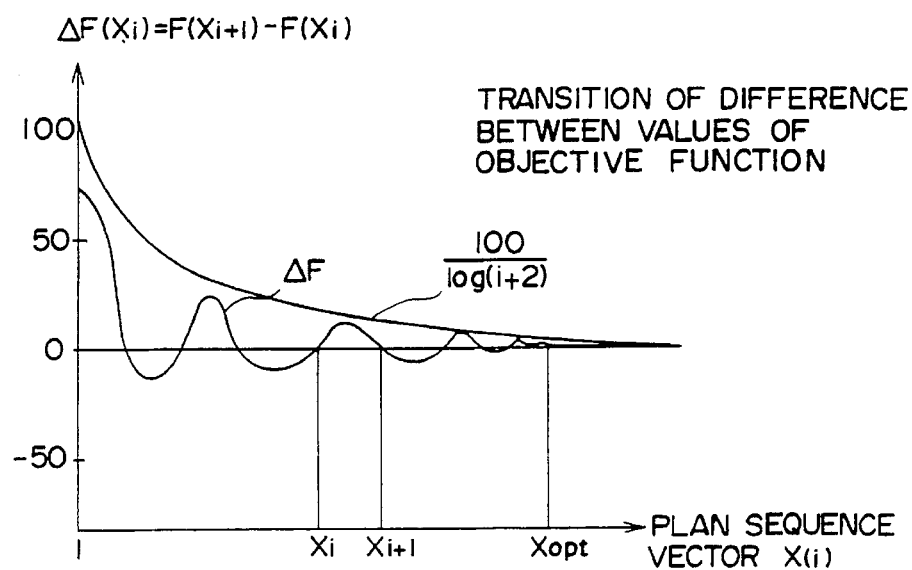

| J | | K | | C | |
|---|---|---|---|---|---|
| 1 | 2 | 1 | 9 | 1 | 97 |
| 2 | 8 | 2 | 10 | 2 | 65 |
| 3 | 3 | 3 | 6 | 3 | 89 |
| 4 | 7 | 4 | 8 | 4 | 94 |
| 5 | 2 | 5 | 5 | 5 | 92 |
| 6 | 1 | 6 | 4 | 6 | 31 |
| 7 | 9 | 7 | 10 | 7 | 68 |
| 8 | 7 | 8 | 8 | 8 | 15 |
| 9 | 2 | 9 | 7 | 9 | 77 |
| 10 | 1 | 10 | 2 | 10 | 79 |
| 11 | 4 | 11 | 5 | | 23 |
| $n^3-2$ | | $n^3-2$ | | $n^3-2$ | 5 |
| $n^3-1$ | 8 | $n^3-1$ | 9 | $n^3-1$ | 19 |
| $n^3$ | 6 | $n^3$ | 9 | $n^3$ | 13 |

UNIFORM RANDOM NUMBERS OF INTEGERS WITHIN RANGE OF 1 THRU n, J < K

TABLE FOR EVALUATING DIFFERENCES BETWEEN VALUES OF OBJECTIVE FUNCTION

TRANSITION OF DISTRIBUTION AREA OF C(i) FOR $C_1=100$

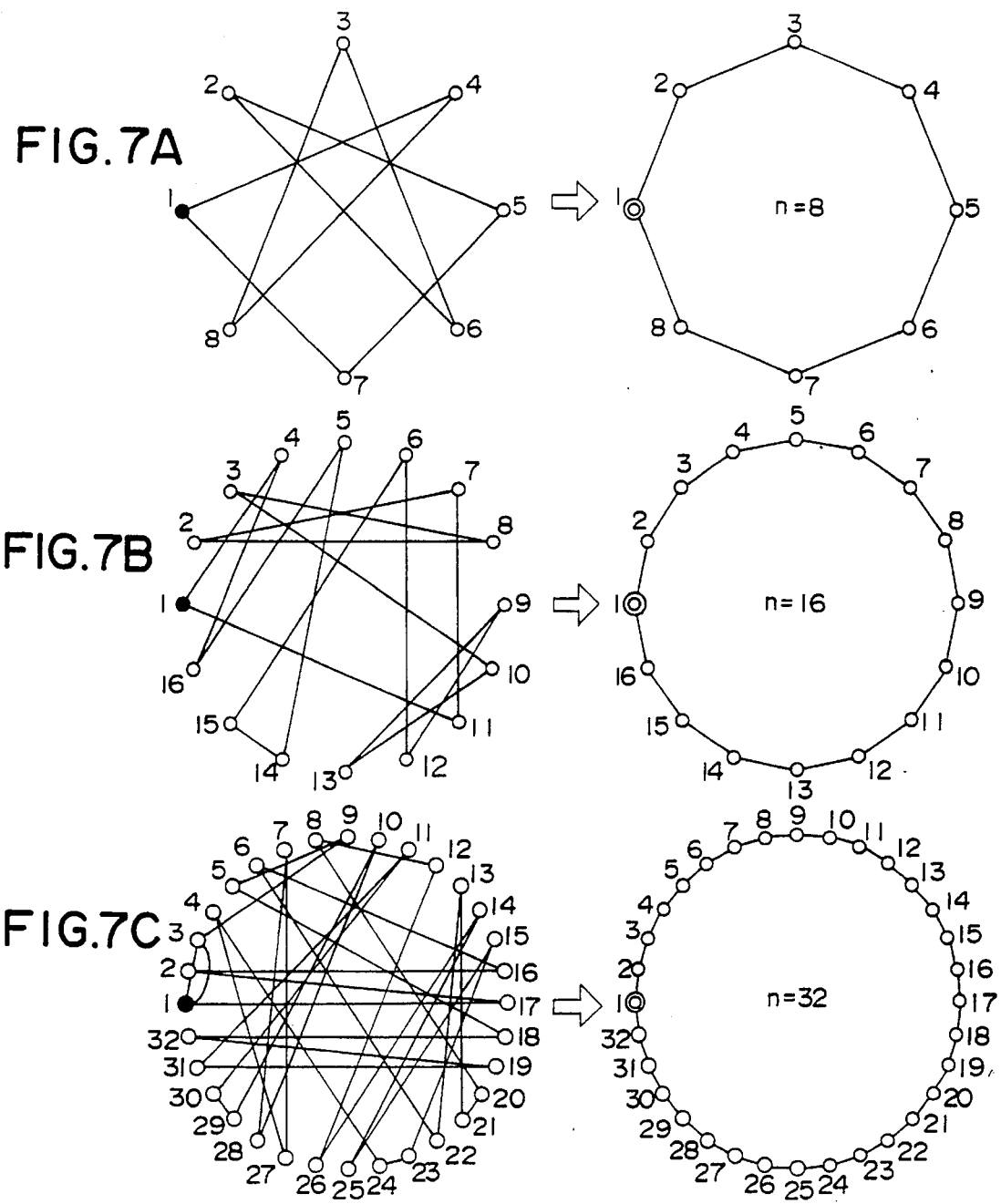

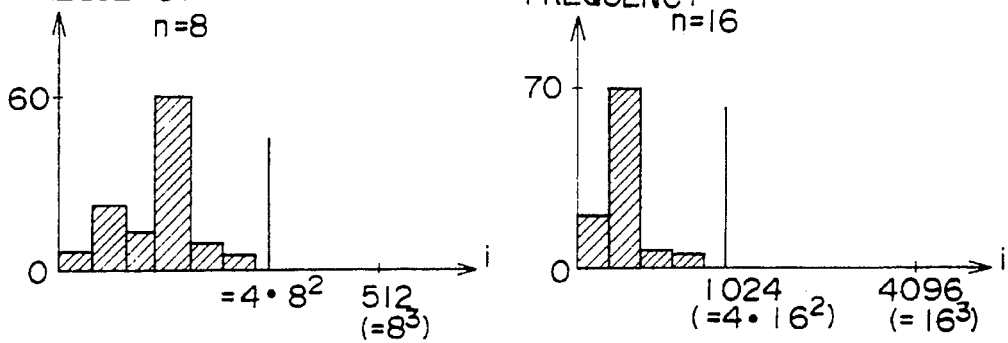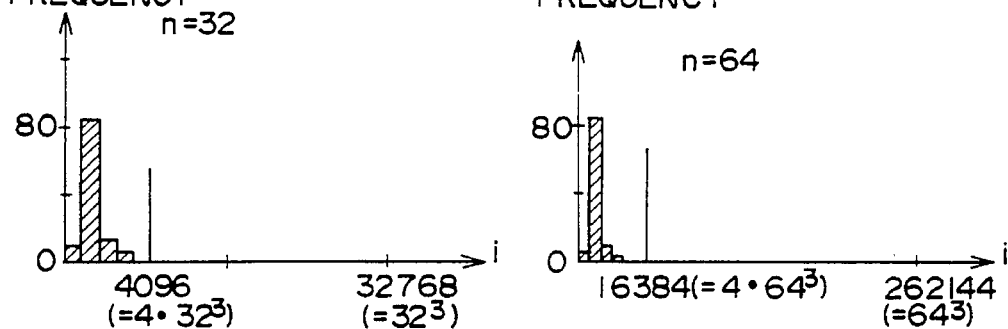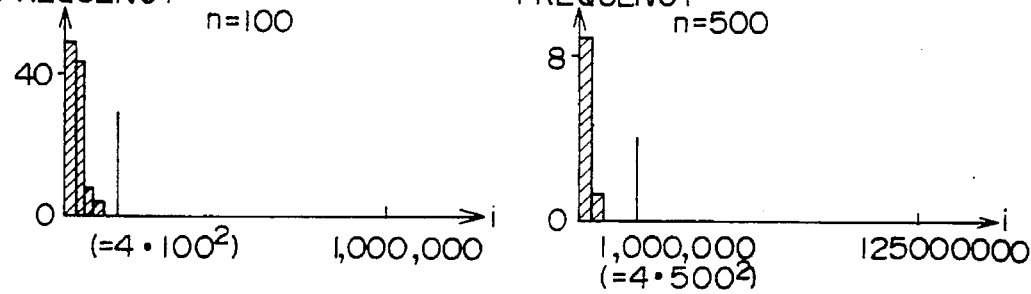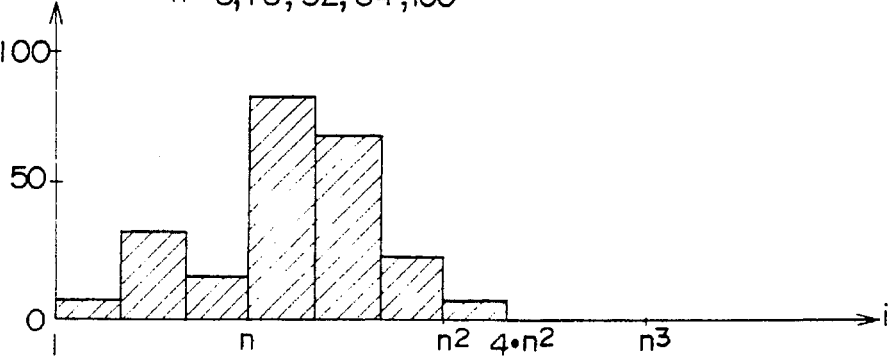

FIG. 12
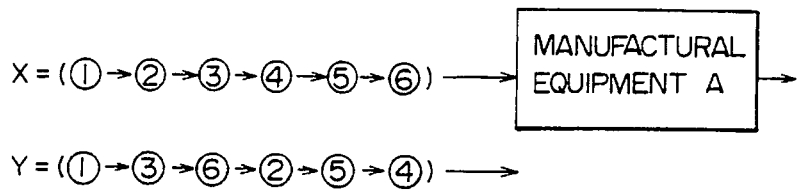
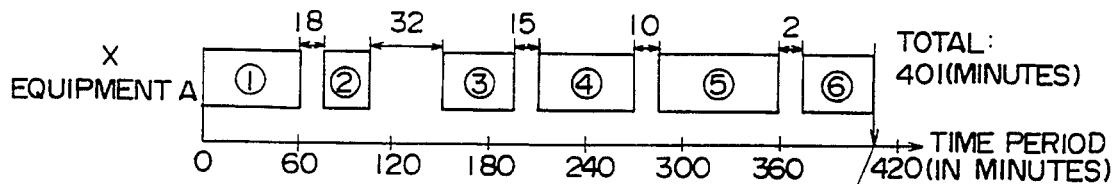
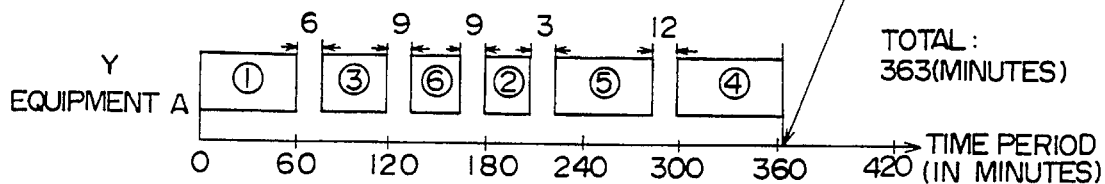
TOTAL SETUP TIME PERIOD OF X = 77 (MINUTES)
TOTAL SETUP TIME PERIOD OF Y = 39 (MINUTES) ↓ SHORTENING OF 50 (%)

PLANNING METHOD AND SYSTEM

BACKGROUND OF THE INVENTION

1. Field of the Invention

The present invention relates to technology for offering the optimum plans of multifarious planning problems in various fields. More particularly, it relates to a planning method of and a planning system for solving a problem which involves an enormous number of combinations or permutations and as to which a plan being the optimum solution exists without fail, with a simple construction and at a very high speed.

2. Description of the Related Art

In a variety of fields (for example, the design of the pattern to-be-printed of an electronic circuit board, a manufactural process, the design of piping in sewerage, and a materials handling system), various techniques have been proposed in order to find the optimum solutions within realistically allowable time periods in the planning of problems of multifarious purposes, wherein the optimum solutions are plans each of which maximize or minimize predetermined items.

By way of example, as stated in a report "Epoch-making Solution for 'Traveling Salesman Problem'—Marvelously excellent results obtained by utilizing chaos" in a magazine "Kagaku Asahi (1993-Feb.)" or the official gazette of Japanese Patent Application Laid-open No. 304587/1990 entitled "System for Calculating Shortest Distance, Shortest Time or Lowest Traffic Cost", a mutual coupling type neural network, a chaotic technique, etc. are applied with the intention of realizing an expedient in which the plans of planning problems in various fields are optimized within actually allowable time periods.

In contrast to a so-called "enumeration method", wherein the combinations of all thinkable plans are studied on a given planning problem, recent optimization expedients which include the aforementioned example of the applications of the mutual coupling type neural network, the chaotic technique, etc. have a common idea as stated below. First, a certain plan is formed. Thenceforth, while the content of the plan is being efficiently altered little by little, the value of an objective function which expresses an item desired to be finally maximized or minimized in the planning problem is evaluated on and on (that is, plans are not formed at random, but the optimum solution is intended to be obtained in a small number of times of planning). Herein, a superior plan (for example, a plan which decreases the objective function value) is adopted as the succeeding candidate for the optimum plan, namely, the plan which maximizes or minimizes the objective function. Thus, it is intended to eventually obtain the optimum solution in a short time period.

Any of the prior-art techniques, however, have the following drawbacks:

(1) Each time a new plan is formed it requires at least $n^2$ to $n^3$ operation processes to be executed, in order to configure the new plan, where letter n denotes the number of the constituent elements (the objects to-be-dealt-with) of the particular plan. Herein, the constituent elements act as the parameter of the planning operation for optimizing the objective function.

(2) There is not the theoretical support that the optimum solution can be reached, and the optimality is empirically evaluated. Accordingly, a long processing time period is expended in attaining to the optimum solution or a quasi-optimum solution. Moreover, the optimum solution is attained to at a very low probability.

By way of example, in a system explained in the above report of the magazine, the settlement of the so-called "traveling salesman problem" for determining the shortest one of routes in each of which 30 places are respectively visited only once requires a long time period of 20 [seconds] even when a recent computer (for example, a work station having a capability of 10 to 100 [MIPS (million instructions per second)] is used. Besides, the optimum solution is erroneously found at a probability of 3 [%].

SUMMARY OF THE INVENTION

It is therefore an object of the present invention to eliminate the drawbacks stated above, and to provide an expedient in which the optimum solution, namely, a plan maximizing or minimizing an objective function can be obtained in a very short time period from within a planning problem having an enormous number of combinations.

The present invention for accomplishing the object consists in a planning system, comprising:

setting means for accepting, at least, a given planning problem, and values of a variable required for solving the problem; optimization means for creating an objective function which expresses an item intended for either of minimization and maximization in the planning problem, and for forming a plan which affords either of minimum and maximum values of the created objective function; and storage means for storing therein, at least, a variable required for forming the plan;

the optimization means including calculation means for calculating a difference value between-values of the objective function assumed in a plan formed last and a plan formed anew; and replanning means for comparing the difference value of the objective function with a value of the variable previously set in the storage means, and for substituting the last formed plan by the plan formed this time and setting the latter as a candidate for the optimum plan, on condition that the difference value of the objective function is smaller than the value of the preset variable.

Preferably, the planning system further comprises display means for displaying the processed result of the optimization means.

Also, the present invention consists in a planning method wherein a content of a given candidate for a plan is altered so as to minimize or maximize a value of an objective function which expresses an item intended to be minimized or maximized in the plan, comprising the steps of:

altering part of an element arrayal of a permutation in a case where the plan is a permutation problem, and at least one element to-be-selected in a case where the plan is a combination problem; and calculating a difference between values of the objective function assumed before and after the alteration, and setting the new plan after the alteration as a candidate for an optimum plan on condition that the difference is smaller than a value which is uniformly distributed within a range of values decreasing gradually each time the plan is altered.

In operation, the present invention consists in a very clear optimizing method which does not adopt other redundant means for minimization, such as a neural network (a large number of means unnecessary for optimization have been involved in the prior art).

Concretely, according to the present invention, only two steps are included in each of iterative processes for forming plans, as follows:

(Step 1)

A plan content is changed with respect to a plan formed last, whereupon a new plan is formed anew this time. Note is taken of the changed part, and a difference value which is taken between the values of an objective function assumed last time and this time and which has been developed by the change is calculated.

(Step 2)

The difference value of the objective function obtained at the step 1 is compared with a predetermined value, and the processing flow of the optimizing method is returned to the step 1 on condition that the last plan is superior, in other words, when the difference value of the objective function does not fall within the predetermined value.

On condition that the current plan is superior, in other words, that the difference value of the objective function falls within the predetermined value, processing for the substitution of the last plan by the current plan is executed.

Letting $n$ denote the number of elements to-be-optimized, the above two steps may be iterated $n^3$ times in a case of obtaining the optimum solution, and $C \times n^2$ times (for example, C=40) in a case of obtaining a quasi-optimum solution which is sufficiently close to the optimum solution.

(Step 1) has the number of times of its processing determined by the sort of the objective function and the method of forming the new plan. Since, however, note is taken of the difference value, the number of times of the processing does not depend upon the number n of elements to-be-optimized.

Regarding (Step 2), the processing for the substitution by the current plan is comparatively often executed at the initial stage of the iterative processes, whereas the number of times of the substitution processing becomes very small after an area vicinal to the optimum solution has been reached. The number of times of renewing the plan depends upon the number n of elements. Since, however, the number n is much smaller than a number $n^2$ it is negligible as compared with the number $n^3$ or $Cn^2$ of times of iteration.

The value at (Step 2) as needs to be preset is associated with an the replanning method at (Step 1). It may be set so as to assume a narrower range of values with increase in the number of times of planning.

Incidentally, the principal feature of the present invention resides in that optimizations of plans in various fields can be perfectly achieved by a simple construction which comprises, at least, means for executing the two steps, and means for storing therein constants required for forming the plans. The constants required for forming the plans are permitted to be selected at will.

When the C language being a kind of high-level language is used by way of example, (Step 1) can be described in one line or so. (Step 2) can also be described in one line or so in each of most planning problems.

Accordingly, one time of study can be stated by several steps even when the machine instructions of a computer are used. Therefore, the method of the present invention can realize a markedly higher processing speed than in the prior-art method.

By way of example, in the prior-art method, $n^3$ steps are involved in one time of study. When such studies are iterated $n^3$ times, $n^6$ processing steps are required in total.

As a practicable example, in the report of the magazine cited before, the objective function E(i) which expresses the item intended to be optimized, that is, to be minimized or maximized is set as a total distance, and it is defined as follows in order to minimize the total distance:

$$E(i) = \Sigma\Sigma\Sigma d_{ab} \cdot V_{bc}(i) \cdot (V_{bc-1}(i) + V_{bc+1}(i))$$

(The first $\Sigma$ denotes the summation of a=1 to n, the second $\Sigma$ denotes the summation of b=1 to n, and the third $\Sigma$ denotes the summation of c=1 to n.) Here, the term $d_{ij}$ denotes the distance between spots $\underline{i}$ and $\underline{j}$, and the term $V_{ij}$ denotes the probability at which the spot $\underline{i}$ is visited as the jth place.

The execution of this formula requires, at least, $n^3$ times of calculations. Strictly, a term of $n^4$ is existent in the example stated in the aforecited report. Since, however, a required processing time period is too long, the prior-art example shall be explained below as needing the $n^3$ times of calculations.

On the other hand, according to the present invention, the number $\underline{n}$ of elements is not involved in one time of planning. Therefore, even when such planning operations are iterated $n^3$ times, the number of total processing steps is as small as $C \times n^3$ (where C denotes 'the number of steps required for one time of planning'≈10).

Let's consider a case where an optimization problem of n=1000 is to be solved using a computer which is capable of executing $10^3$ instructions in one second (a computer of 1000 [MIPS]).

In this case, a processing time period $T_{old}$ required in the prior-art method becomes, at least:

$$\begin{aligned} T_{old} &= (n^3 \times n^3)/(1000 \text{ [MIPS]}) \\ &= 1000^6/10^9 \\ &= 10^{18}/10^9 = 10^9 \text{ [seconds]} \approx 32 \text{ [years]} \end{aligned}$$

(The first $n^3$ denotes the number of steps required for one time of replanning, and the second $n^3$ denotes the number of times of iteration.)

In contrast, a processing time period $T_{new}$ required in the present invention is, at most:

$$\begin{aligned} T_{new} &= (C \times n^3)/(1000 \text{ [MIPS]}) \\ &= (10 \times 1000^3)/10^9 \\ &= 10^{10}/10^9 = 10 \text{[seconds]} \end{aligned}$$

Therefore, the present invention shortens the processing time period to $1/10^8$ and achieves a much higher processing speed.

The higher processing speed achieved signifies that, when an allowable processing time period is prescribed, the size of a problem which can-be solved in an identical time period enlarges with great strides.

By way of example, let it be supposed that the allowable time period is 10000 [seconds] (≈3 [hours]). Then, the number $n_{old}$ of objects (elements) to-be-optimized which can be handled by the prior-art method is:

$$\begin{aligned} n_{old} &= \sqrt[6]{(10000 \times 10^9)} \\ &= \sqrt[6]{(10^{13})} < 148 \quad \left(\text{where } \sqrt[6]{\phantom{x}} \text{ denotes a sixth root}\right) \end{aligned}$$

On the other hand, the number $n_{new}$ of objects (elements) to-be-optimized which can be handled by the method of the present invention is:

$$n_{new} = \sqrt[3]{(10000 \times 10^9/10)}$$

$$= \sqrt[3]{(10^{12})} = 10^4 \left( \text{where } \sqrt[3]{\phantom{x}} \text{ denotes a third root} \right)$$

That is, according to the present invention, the optimization problem having the 10000 elements can be solved within 10000 [seconds].

BRIEF DESCRIPTION OF THE DRAWINGS

FIG. 4 is a diagram for explaining the perturbation and evaluation of a plan;

FIG. 5A is a graph showing an example of transition of the value of an objective function;

FIG. 5B is a graph showing an example of transition of the difference between the values of the objective function;

FIGS. 7A, 7B and 7C are explanatory diagrams each showing an example of operation of the optimizing system in the embodiment;

FIGS. 8A through 8G are histograms each showing the frequency distribution of the number of times of studies required for optimization;

FIG. 12 is a diagram for explaining an example of application to a production planning system.

PREFERRED EMBODIMENTS OF THE INVENTION

Now, embodiments of the present invention will be described in detail with reference to the accompanying drawings.

Figure 1:
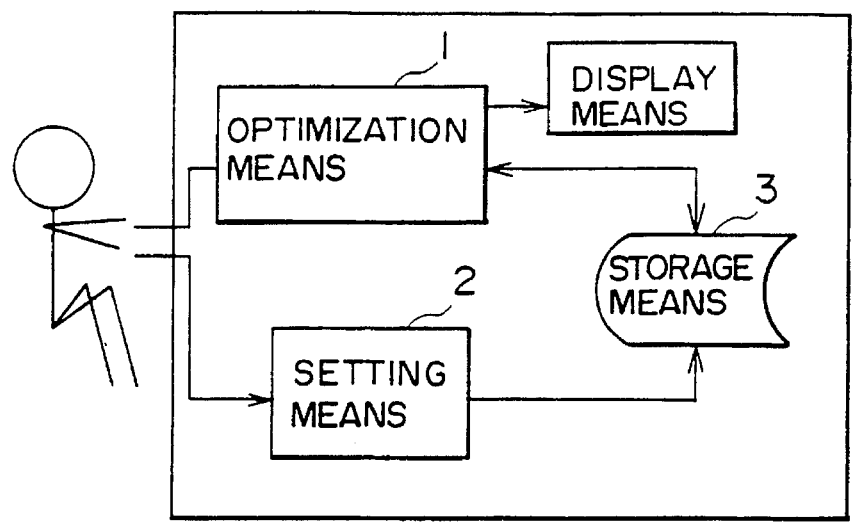
FIG. 1 is a block diagram showing the construction of an optimizing system in an embodiment of the present invention.

FIG. 1 illustrates an example of construction of a planning system (hereinbelow, often called the "optimizing system") according to the present invention.

The optimizing system is constructed comprising optimization means 1, setting means 2 and storage means 3.

The setting means 2 has, at least, the facility of accepting a given planning problem, and the facility of accepting constants indicative of parameters required for planning. By way of example, it can be implemented by a keyboard and a mouse.

The optimization means 1 operates to form the optimum plan. It creates an objective function which expresses an item intended to be minimized or maximized in the given planning problem, and it executes, at least, processing steps #1 and #2 to be explained below, in order to maximize or minimize the value of the objective function. By way of example, it can be implemented by electron devices such a CPU (central processing unit), a ROM (read-only memory) and a RAM (random access memory).

At the step #1, a plan content is changed on the basis of a new plan formed last time, thereby forming a plan this time. Further, with note taken of the changed part, the value of the difference between the values of the objective function developed by the change and assumed last time and this time is found.

Subsequently, at the step #2, the difference value of the objective function obtained at the step #1 is compared with a predetermined value. Further, the processing flow of the optimization means 1 is returned to the step #1 on condition that the last plan is superior, in other words, when the difference value of the objective function does not fall within the predetermined value.

On condition that the current plan formed this time is superior, in other words, that the difference value of the objective function falls within the predetermined value, processing for the substitution of the last plan by the current plan is executed.

Besides, the storage means 3 stores therein, at least, the problem given through the setting means 2, and constants for use in optimization. By way of example, it is implemented by a RAM.

Incidentally, the optimizing system should preferably be so constructed that display means, such as a liquid-crystal panel, an EL (electroluminescent) display unit or a CRT (cathode-ray tube), is connected to the optimization means 1 so as to display the planning problem and necessary constants stored in the storage means 3 through the setting means 2, the processed result of the optimization means 1, and so forth.

Figure 2:
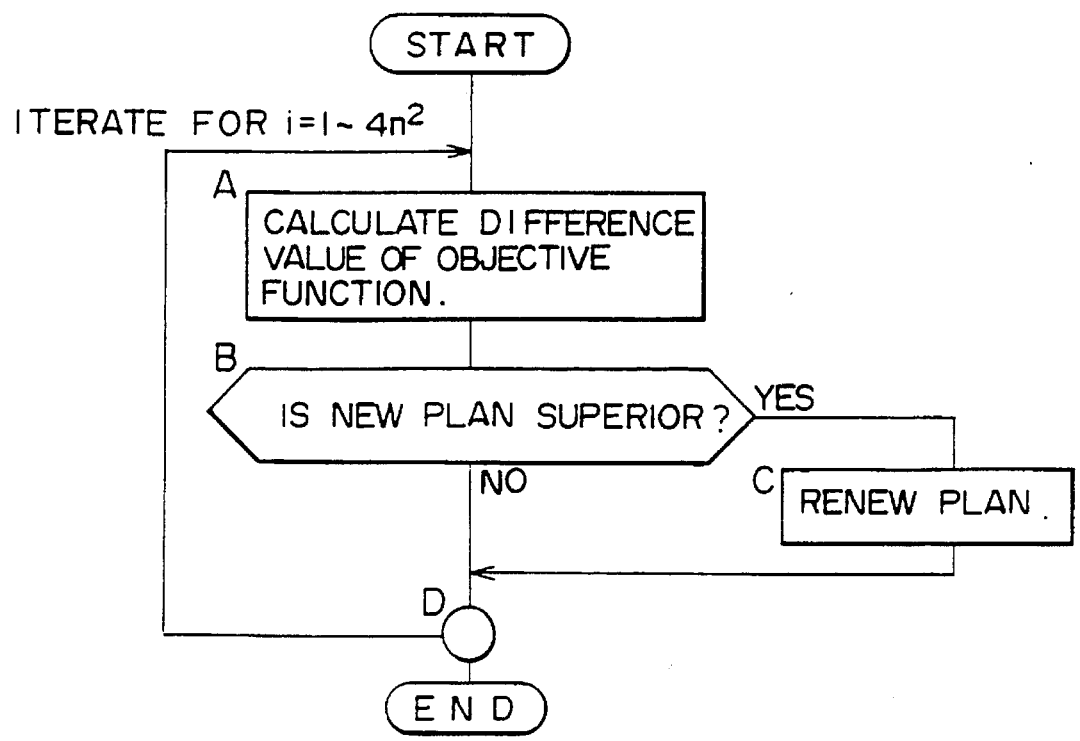
FIG. 2 is a flow chart for explaining the processing steps of optimization means included in the embodiment.

Next, FIG. 2 illustrates the processing steps of the optimization means 1.

This means 1 has the facility of executing the step A of calculating the difference value of an objective function between the current plan and the last plan; the step B of comparing the difference value of the objective function with a constant value stored in the storage means 3, and then judging whether or not the pertinent plan is renewed; the step C of renewing the candidate for the optimum solution on condition that the current plan is superior (that is, when the difference value of the objective function falls within the predetermined range of values); and the step D of updating an iteration pointer $\underline{i}$ so as to iterate the above processing $C \times n^2$ times (for example, $C=4$) or $n^3$ times.

The details of the operation of the present invention will be described with reference to FIGS. 3A and 3B, et seq.

Figures 3A, 3B:
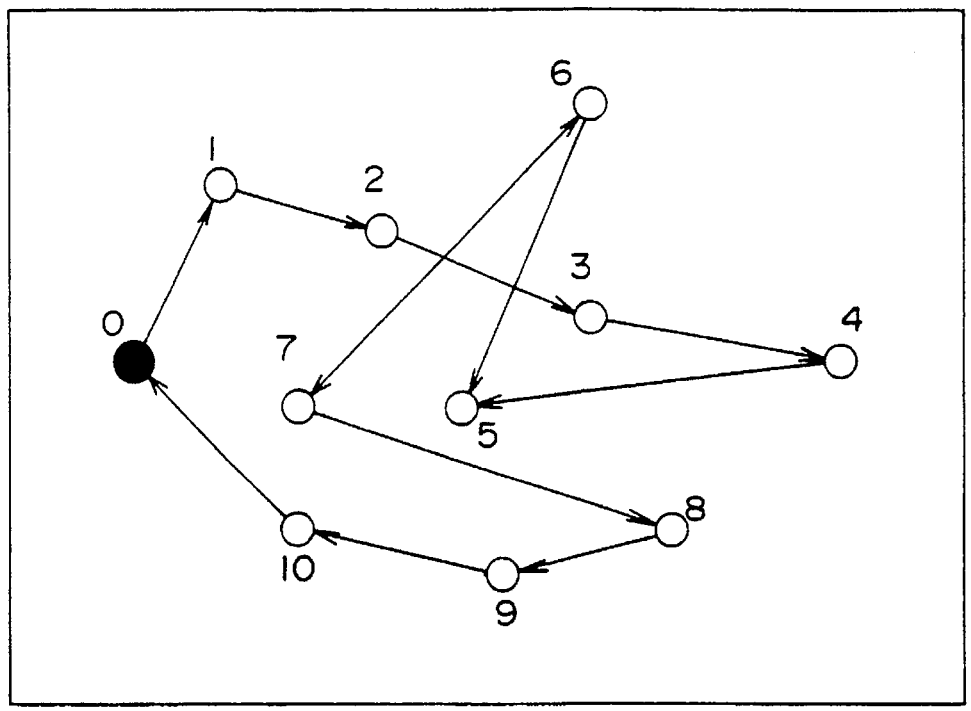
FIG. 3A is a diagram showing a set example of information to-be-optimized.
FIG. 3B is a table in which the distances between the respectively adjacent spots are matrixed.

FIG. 3A exemplifies a so-called "traveling salesman problem" as a planning problem, and illustrates the state in which the problem given through the setting means 2 is set. Such a state may be displayed by the display means as explained before.

The exemplary problem is a problem for determining, for example, a route of the shortest distance among routes each of which starts from a spot "0: ●" and returns to the spot ● again after visiting spots "1" thru "10" only once.

Here, the objective function is defined as the summation of individual distances, and the aim of optimization is to make the total distance of the route the shortest. It is to be understood, however, that various other objective functions can be defined. Needless to say, the objective function may well be, for example, the summation of time periods which are expended in visiting all the places, or the summation of energy amounts which are consumed by an automobile or the like for visiting the places.

A set visiting sequence shown in FIG. 3A is expressed by a vector X as follows:

$$X=(1, 2, 3, 4, 5, 6, 7, 8, 9, 10)$$

Besides, it is supposed that the distances between the respectively adjacent distances are predetermined.

In this case, the matrix D (f, t) of the distances from a spot $\underline{f}$ to a spot $\underline{t}$ (where letters $\underline{f}$ and $\underline{t}$ denote numbers of 0 thru 10) are stored in the storage means 3 (refer to FIG. 3B).

FIG. 4 illustrates the processing of that step A shown in FIG. 2 which is one of the principal contrivances of the present invention.

The fundamental concept of planning is to slightly change the arrayal of the elements of the given plan X. Here in this specification, such a change shall be called the "perturbation".

Concretely, one example of the perturbation is to reverse the arrayal of the elements included in a range from the jth=the third element to the kth=the eighth element among the elements constituting the vector X. In general, letters $\underline{j}$ and $\underline{k}$ denote random numbers which satisfy the conditions of:

$$j<k,$$

and $$1 \leq j, k \leq 10,$$

and which are uniformly distributed within the above range, respectively.

The reversing operation sets a new plan Y as follows:

$$Y=(1, 2, 8, 7, 6, 5, 4, 3, 9, 10)$$

Next, F(A) is let denote the objective function of a certain plan A. Further, since the total distance is evaluated in the illustrated example, the spot "●" shall be denoted by "11" for the convenience of the ensuing calculations. Then, the objective function F(X) of the plan X becomes:

$$F(X)=\Sigma D_{m \rightarrow m+1} \text{ ($\Sigma$ denotes the summation of m=1 thru 10)}$$

$$\begin{aligned} &= D_{1\rightarrow 2} + D_{2\rightarrow 3} + D_{3\rightarrow 4} + D_{4\rightarrow 5} + D_{5\rightarrow 6} + \\ & \phantom{=} D_{6\rightarrow 7} + D_{7\rightarrow 8} + D_{8\rightarrow 9} + D_{9\rightarrow 10} + D_{10\rightarrow 11} \\ &= 17 + 23 + 27 + 41 + 34 + 45 + 43 + 12 + 22 + 24 \\ &= 288 \end{aligned}$$

Similarly, the objective function F(Y) of the plan Y becomes:

$$\begin{aligned} F(Y) &= D_{1\rightarrow 2} + D_{2\rightarrow 8} + D_{8\rightarrow 7} + D_{7\rightarrow 6} + D_{6\rightarrow 5} + \\ & \phantom{=} D_{5\rightarrow 4} + D_{4\rightarrow 3} + D_{3\rightarrow 9} + D_{9\rightarrow 10} + D_{10\rightarrow 11} \\ &= 17 + 45 + 43 + 45 + 34 + 41 + 27 + 27 + 22 + 24 \\ &= 325 \end{aligned}$$

It is intuitively seen from FIG. 4 that the route of the plan Y is longer. Here, the difference value $\Delta F_{xy}$ between the values of the objective function assumed by the plans X and Y is defined as:

$$\Delta F_{xy}=F(Y)-F(X)$$

Then, the difference value $\Delta F_{xy}$ becomes:

$$\begin{aligned} \Delta F_{xy} &= 325 - 288 \\ &= 37 \end{aligned}$$

FIGS. 5A and 5B illustrate properties inherent in the transition of the value of the objective function and that of the difference between the values of the objective function, respectively, the inherent properties having been found out by the inventors. In FIG. 5A, the axis of abscissas represents a plan sequence vector X(i) which is determined by the number $\underline{i}$ of times of planning, while the axis of ordinates represents the value of the objective function F (X$_i$).

As the arrayal of the elements of the plan sequence vector is changed little by little and the values of the objective function based on the changes are compared, the plan sequence vector closer to the optimum solution is employed substitutionally and appropriately.

In this case, it is seen from FIG. 5A that, even when an extreme point (a minimum point in the example referred to here) is afforded by, e. g., the plan sequence vector $X_i$, the processing is shifted to the next vector $X_{i+1}$, whereby the optimum-solution vector $X_{opt}$ is reached after the sufficient planning.

In this manner, the processing may be carried forward by creating the new plan $X_{i+1}$ each time, calculating the objective function value $F(X_{i+1})$, comparing the calculated value with the objective function value $F(X_i)$ of the last plan $X_i$, and setting the plan of smaller or larger value as the candidate for the optimum plan. This method, however, requires an enormously long time period for creating the new plans and calculating the objective function values, in a case where the number $\underline{n}$ of the objects to-be-handled (the elements to-be-planned) is very large.

In order to eliminate such a demerit, the present invention dispenses with the creation of the new plan in each planning operation. This expedient has been derived from the property exhibited by the planning problem, as will be elucidated below.

In FIG. 5B, the axis of abscissas represents the plan sequence vector X(i), while the axis of ordinates represents the differential value $\Delta F(X_i)$ of the objective function $F(X_i)$ with respect to the vector X(i). That is:

$$\Delta F(X_i)=dF(X_i)/dX_i=F(X_{i+1})-F(X_i)$$

This formula expresses the difference value of the objective function at each time of planning. In the case where the objective function value $F(X_{i+1})$ of the new plan $X_{i+1}$ is smaller than that $F(X_i)$ of the last plan $X_i$, the difference value $\Delta F(X_i)$ becomes minus, and in any other case, the difference value $\Delta F(X_i)$ becomes zero or plus.

As seen from FIG. 5B, the transition of the difference value $\Delta F(X_i)$ corresponds to that of the objective function value $F(X_i)$ shown in FIG. 5A. The waveform of the difference value $\Delta F(X_i)$ resembles that of a damped oscillation (i. e., a waveform which changes in period while decreasing in amplitude) centering round zero.

A strict experiment utilizing a computer has revealed that, in general planning problems, such a waveform is exhibited irrespective of the content of the particular problem, and that the degree of damping of the amplitude in the case of considering X(i) as time becomes similar to a form which can be expressed by, for example, C/log(i+2) (C=100 in the illustrated example).

This indicates that, even when the difference value F has become plus, in other words, the new plan has become inferior to the last plan (i.e., when the difference value ΔF has increased in the minimization problem or has decreased in the maximization problem), the new plan is substitutionally set as the candidate for the optimum solution, subject to the plus difference value ΔF being smaller than C/log(i+2), whereby the plan sequence vector X(i) corresponding to the sufficiently large number i can attain to the optimum solution without fail.

The expedient based on the property of the difference value ΔF contribute to enhancement in the processing performance of optimization very greatly. The reason therefor is that merely the plan to-be-optimized may be changed little (in other words, the arrayal of the elements of the pertinent plan may be partly changed) so as to study only the changed part, without the necessity of creating the new plan and then calculating the objective function value for the new plan each time the planning operation is iterated. Thus, how the values of the objective function undergo a transition can be studied without depending upon the number of the objects or elements to-be-optimized, and any planning problem can be solved at high speed.

This merit will be explained in conjunction with practicable examples below.

The first contrivance of optimization resides in a method of calculating the difference value $\Delta F_{xy}$ of the objective function. In the example shown in FIG. 4, all the following formulae have been calculated:

$F(X) = \Sigma(D_{mx})$ (where $\Sigma$ denotes the summation of mx=1 thru 10, and letter X denotes the correspondence of the formula with a plan X)

$F(Y) = \Sigma(Dmy)$ (where $\Sigma$ denotes the summation of my=1 thru 10, and letter Y denotes the correspondence of the formula with a plan Y)

As shown in FIGS. 5A and 5B, however, a large number of unnecessary operations are involved for the optimization (for the minimization of the summation of the individual distances).

This is because the optimization requires the difference values of the objective function, not the objective function values themselves.

In a case where the expedient according to the present invention is applied to the example of FIG. 4, merely the alteration of, at most, two places is done on condition that the evaluations of the certain two spots are reversible (the condition signifies that the relation 1 between the certain two spots is invariable in spite of the change of the turns of these spots, for example, that both the turns ①→② and ②→① have the same distance). Moreover, this fact is not dependent upon the number n of the objects to-be-optimized.

Regarding the example of FIG. 4, the alteration in the case of generating the plan Y from the plan X consists only of the point that the turns $D_{2\to3}$ and $D_{8\to9}$ of the plan X are removed, and the point that the turns $D_{2\to8}$ and $D_{3\to9}$ of the plan Y are added. In terms of a formula, the alteration is expressed as follows:

$$\begin{aligned}\Delta F_{xy} &= F(Y) - F(X) \\ &= (D_{1\to2} + D_{2\to8} + D_{8\to7} + D_{7\to6} + D_{6\to5} + D_{5\to4} + \\ &\quad D_{4\to3} + D_{3\to9} + D_{9\to10} + D_{10\to11}) - (D_{1\to2} + \\ &\quad D_{2\to3} + D_{3\to4} + D_{4\to5} + D_{5\to6} + D_{6\to7} + D_{7\to8} + \\ &\quad D_{8\to9} + D_{9\to10} + D_{10\to11})\end{aligned}$$

Here in this problem, the following holds true of any desired spots j and k:

$D_{j\to k} = D^{k\to j}$

Therefore, the following holds:

$\Delta F_{xy} = (D_{2\to8} + D_{3\to9}) - (D_{2\to3} + D_{8\to9})$

This expression is generalized using the operation pointers j and k, as follows:

$$\Delta F_{xy} = (D_{(j-1)\to k} + D_{j\to(k+1)}) - (D_{(j-1)\to j} + D_{k\to(k+1)}) \qquad \text{(Eq. 1)}$$

It is accordingly understood that only three times of addition and subtraction processing suffice irrespective of the number n of the objects to-be-optimized.

Thus far, the alterations of the element arrayal of the plan sequence vector, in other words, a mathematical permutation problem have/has been chiefly discussed, but a mathematical combination problem can also be solved on the basis of a similar idea.

Figures 6A, 6B:
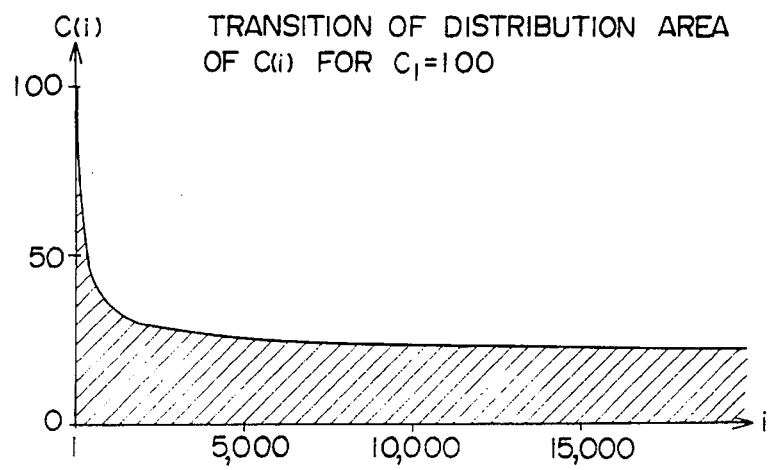
FIG. 6A is a diagram exemplifying constants which are set for optimizing a plan.
FIG. 6B is a graph showing an example of distribution of the constant (C in FIG. 6A)

FIG. 6A illustrates examples of constants which are stored in the storage means 3 beforehand.

Integral values of i=1 thru i=$n^3$ having the following properties are set in each of tables J and K:

(1) J(i)<K(i) (where I denotes the number of times of planning)
(2) $1 \leq J(i)$, $K(i) \leq n$
(3) The integral values are uniformly distributed within the above ranges (2).

Now, (Eq. 1) is rewritten into:

$$\Delta F(i) = (D_{(J(i)-1)\to K(i)} + D_{J(i)\to(K(i)+1)}) - (D_{(J(i)-1)\to J(i)} + D_{K(i)\to(K(i)+1)}) \qquad \text{(Eq. 2)}$$

Here, the following values in the example (FIG. 4) of this embodiment are substituted into (Eq. 2):

J(i)=3

K(i)=8

Then, the following results:

$$\begin{aligned}\Delta F(i) &= (D_{2\to8} + D_{3\to9}) - (D_{2\to3} + D_{8\to9}) \\ &= (45 + 27) - (23 + 12) \\ &= 72 - 35 = 37 = F(Y) - F(X)\end{aligned}$$

It is accordingly understood that the difference value of the objective function can be easily obtained irrespective of the number n.

Besides, the constant C tabulated in FIG. 6A is to be compared with the difference $\Delta F_{xy}$ of the values of the objective function. By way of example, the following values of i=1 thru $n^3$ are set in the table C stored in the storage means 3:

$C(i) = (C_1 \cdot a(i))/\log(i+2)$ where $C_1$ denotes a constant, "log" denotes the natural logarithm, and a(i) denotes uniform random numbers which are distributed within a range of "0.0" thru "1.0".

That is, the constant C may have values whose distribution range narrows with increase in the number i of times of planning. The constant $C_1$ can be easily determined in accordance with the difference ΔF. The transition of the distribution area of the constant C(i) for $C_1$=100 is illustrated in FIG. 6B. The values of the constant C(i) are existent within the hatched area.

FIGS. 7A, 7B and 7C are explanatory diagrams for verifying that the planning system of this embodiment operates properly.

In the verification whose situation is illustrated in each of these figures, regarding a problem whose optimum solution was known beforehand. (a so-called "traveling salesman problem" being a planning problem in which all given spots were to be visited once), whether or not the optimum solution could be reached was checked by setting random visiting turns as initial values.

When the spots are arranged on a circumference, obviously the optimum solution is a circle. It is understood that the optimum solutions were reached for n=8, 16 and 32 (where n denotes the number of the spots) as shown in FIGS. 7A, 7B and 7C, respectively.

An experiment with a computer was conducted under the condition that the number $n$ of the objects (or spots) to-be-optimized and the initial states (or initial turns) X were changed in the case of solving the problems shown in FIGS. 7A thru 7C by the use of the expedient according to the present invention. FIGS. 8A, 8B, 8C, 8D, BE, 8F and 8G are histograms which have been drawn in the experiment. Each of the histograms illustrates the distribution of frequencies (the number of times) which the optimum solution was reached. It is understood that the optimum solutions are attained to by the number $i$ of times of planning below $n^3$ in all the cases up to n=500, and that they are attained to by the number $i$ of times of planning equal to $4 \times n^2$ in almost cases.

This is nothing but indicating the fact that the optimum solution is attained to by making, at least, $n^3$ times of studies, and that a quasi-optimum solution which is effective in practical use is obtained by making about $4 \times n^2$ times of studies.

In order to clarify the effect of the present invention, optimization processing was executed using a computer which had a processing performance of 1000 [MIPS]. Then, a graph shown in FIG. 9 has been obtained. In the graph, the axis of ordinates represents a time period which guarantees the attainment of the planning to the optimum solution, while the axis of abscissas represents the number $n$ of the objects (or spots) to-be-optimized.

It is seen from the graph that the "enumeration method" which is the most primitive and which examines all possible routes requires a time period of 36 [seconds] already for n=10, and that the maximum value of the number R in the practical use thereof is 12 or so.

With the prior-art method applying the neural network and the chaos phenomena as stated before, n=50 to 100 is a limit value in the practical use thereof.

In contrast, according to the present invention in which the processing of each planning does not depend upon the number $n$, a case of n=844 can be optimized in 60 [seconds] by way of example.

Figure 9:
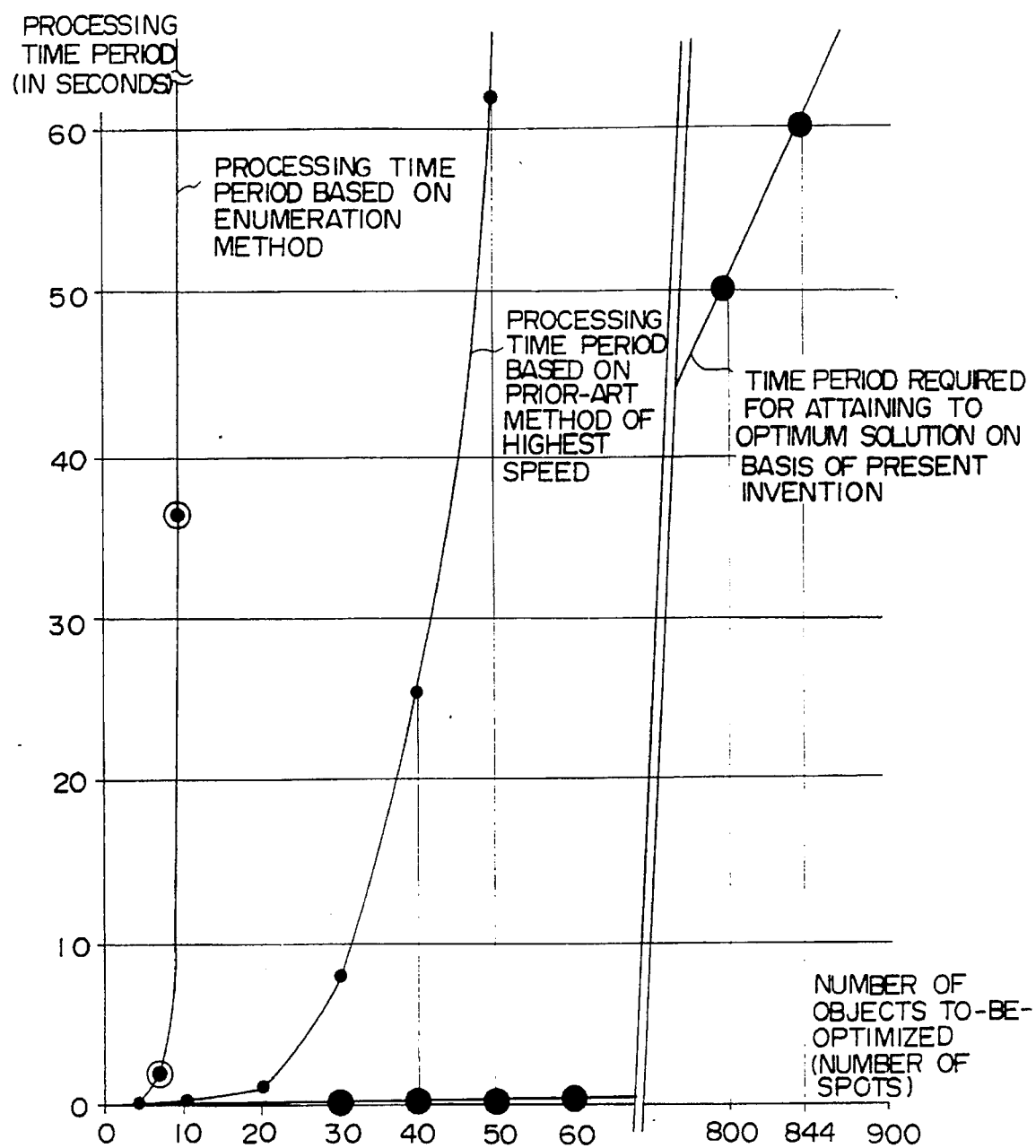
FIG. 9, FIG. 10 and FIG. 11 are graphs each showing the relationships between the number of objects to-be-optimized and a processing time period.
Figure 10:
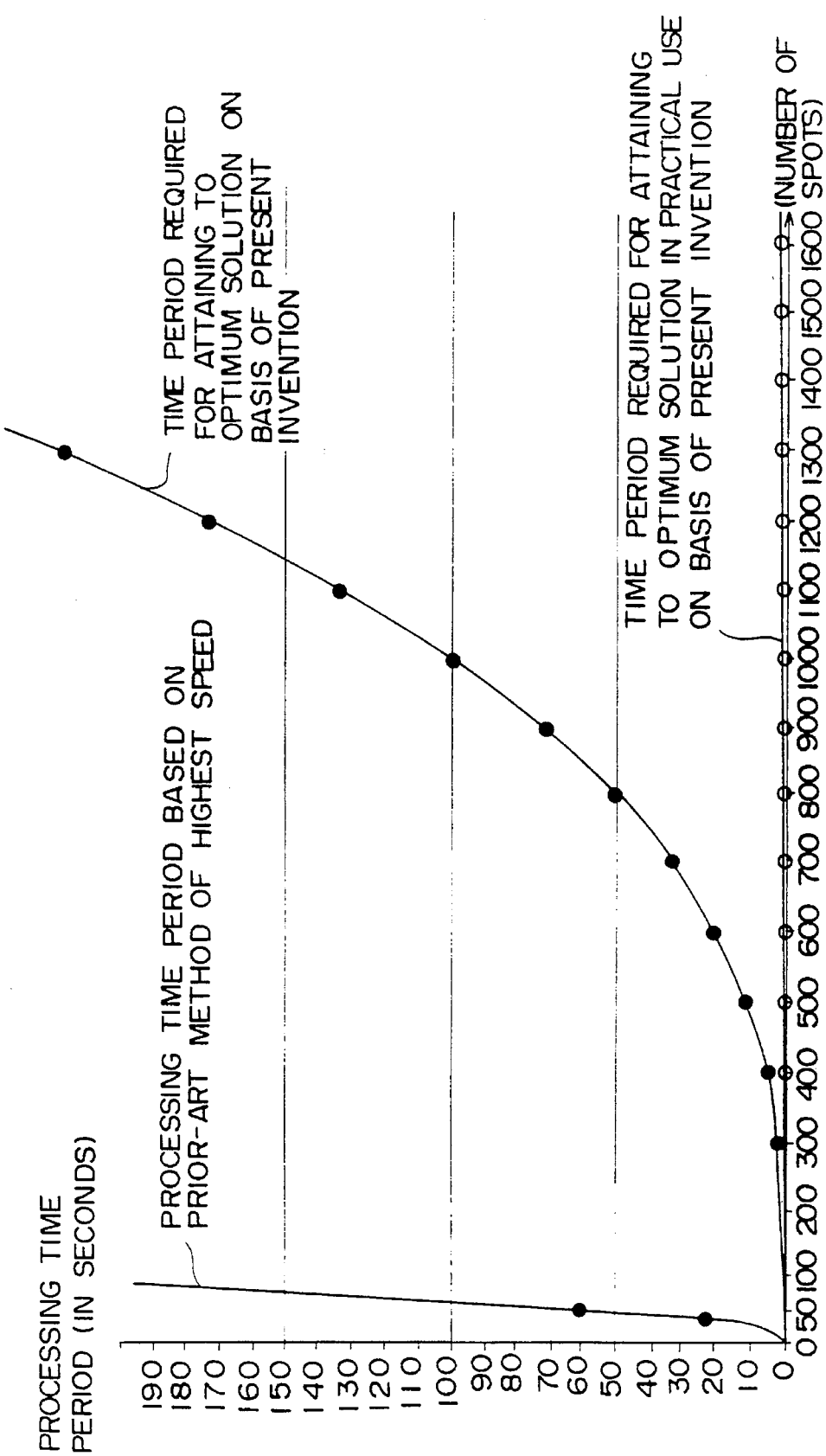

A graph shown in FIG. 10 has been obtained when the limitation of the processability of the expedient according to the present invention was studied by expanding both the ranges of the axes of ordinates and abscissas in FIG. 9. It is seen from the graph that, in case of allowing a processing time period of about 4 [minutes], the optimum solution of a planning problem the number $n$ of elements of which is n=1300 or so can be obtained.

Figure 11:
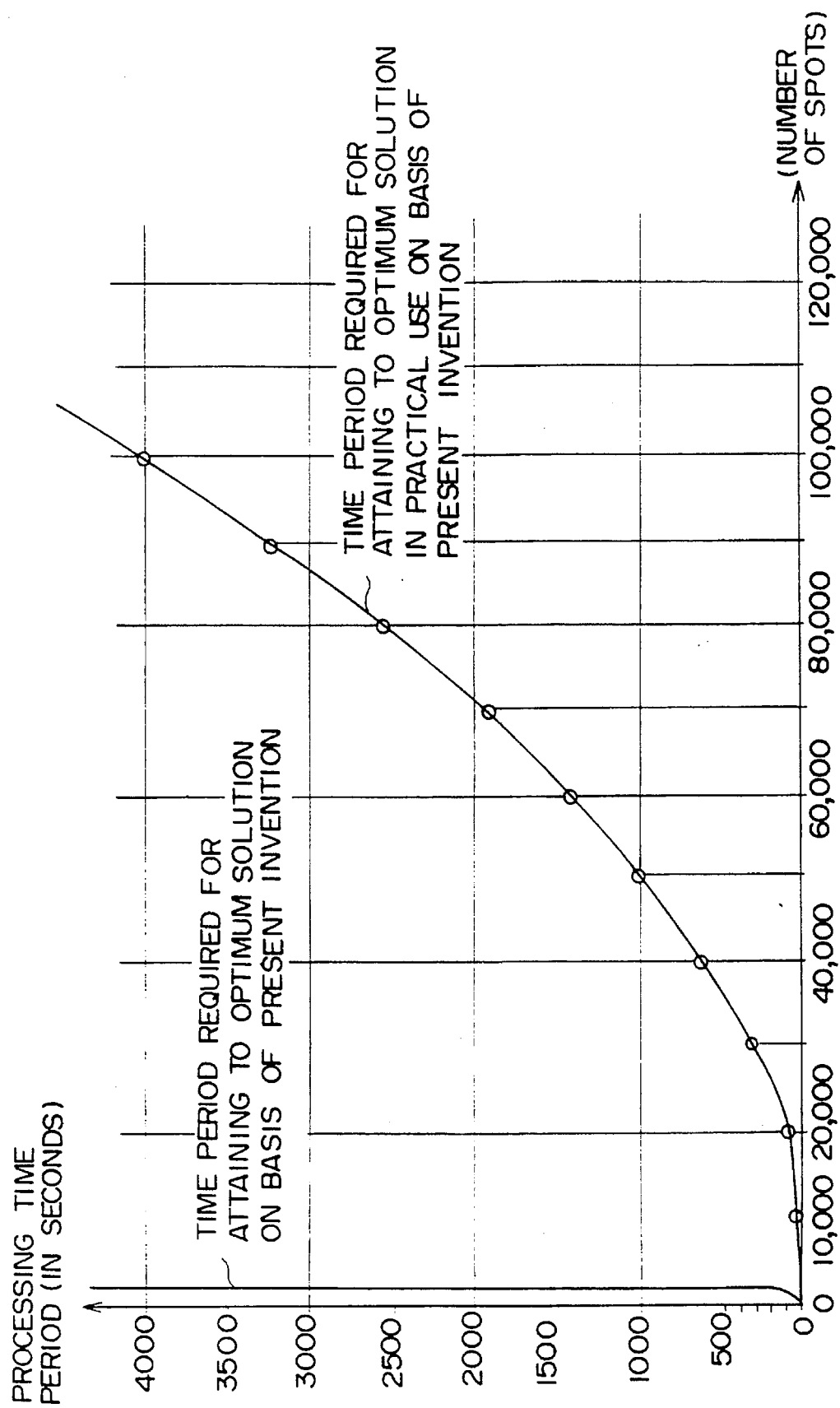

Subsequently, the ranges of the axes of ordinates and abscissas were expanded still more in order to study a processing time period for obtaining a quasi-optimum solution as is important in an actual application. As a result, a graph shown in FIG. 11 has been obtained.

As seen from the graph, a planning problem of enormous scale whose elements amount to n=100000 and which has never been hitherto expected is solved in one [hour] odd (4000 [seconds]). This signifies that the expedient of the present invention has a performance which is enough to be applied even to a very difficult planning problem, for example, the design of a pattern on an electronic circuit board.

FIG. 12 illustrates an embodiment in which the present invention is applied to the optimization of a production plan in the manufacturing industry as is in great demand.

In this embodiment, it is intended to form a plan in which six kinds of jobs ①–⑥ are efficiently performed by a manufacturial equipment A. Since the single equipment A is used, setup or arrangement time periods indicated in the figure, for tool changes, cleaning, the setting of NC (numerical control) machining parameters, etc. are required in shifting the jobs.

Herein, the jobs and the setup time periods are respectively brought into correspondence with traveling spots and the distances between the traveling spots. A total job time period is set as an objective function, and it is to be minimized.

Then, the planning of this embodiment corresponds exactly to the "traveling salesman problem" described before. Further, the minimization of the total job time period is equivalent to that of a total setup time period. The total setup time period is 77 [minutes] in an initial plan X, and it is shortened to 39 [minutes] in a plan Y by the planning system of the present invention (that is, shortening of 50 [%] is achieved). Accordingly, the total job time period is sufficiently shortened.

The number of equipments located in an actual factory of large scale is as large as several hundred, while the number of jobs becomes as large as several thousand to tens of thousands in one month. In this regard, the example in FIG. 11 indicates that the practical optimum solution can be obtained in a very short time period. Accordingly, as the scale of the manufacturing industry is larger, the present invention will demonstrate its effect more.

Figure 13A:
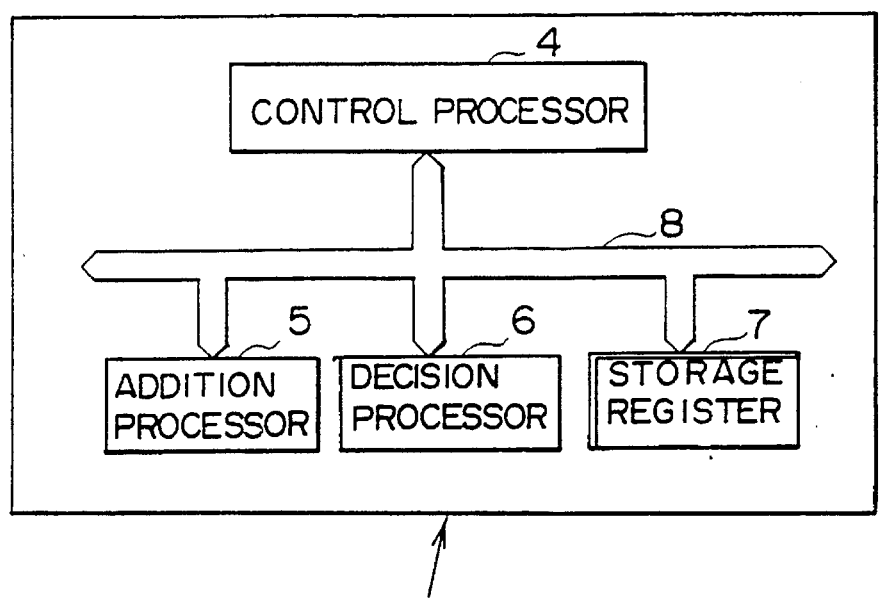
FIG. 13 is a diagram showing an embodiment of the hardware architecture of the system according to the present invention.
Figure 13B:
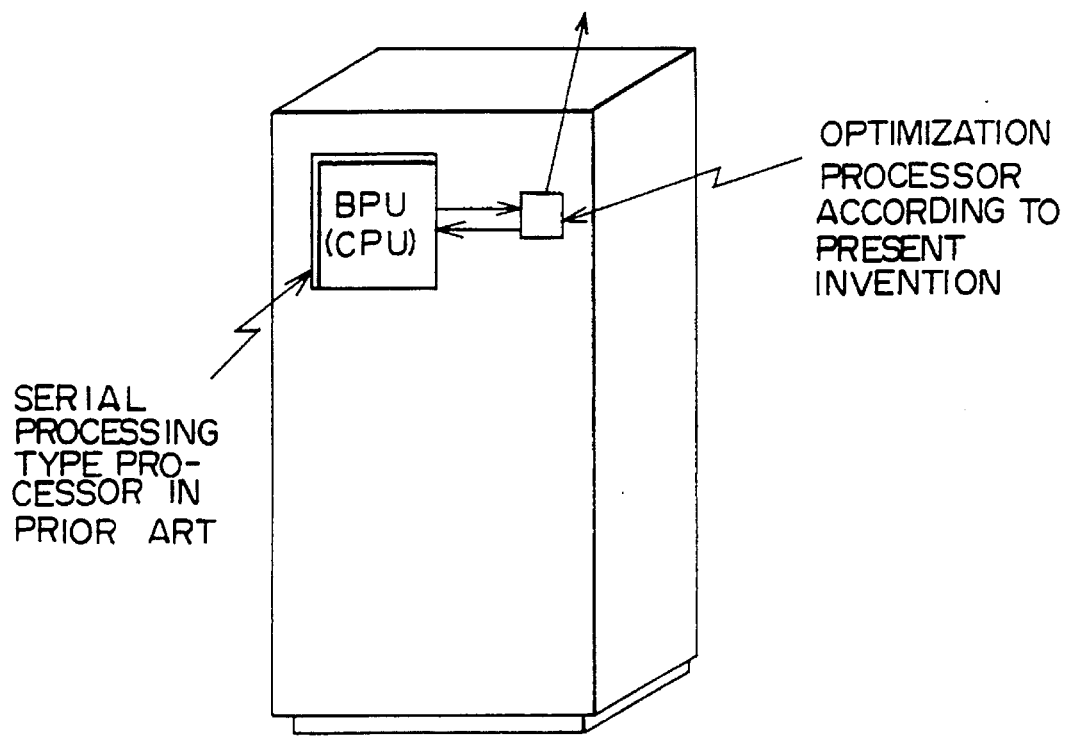

FIG. 13 illustrates a hardware architecture in an embodiment of the present invention.

This embodiment is constructed comprising a control processor 4 which controls the flow of a series of processing for solving a planning problem, an addition processor 5 which calculates the difference value of an objective function, a decision processor 6 which compares the difference value of the objective function with a constant value and which sets a new plan as a candidate for the optimum plan at need, and a storage register 7 in which constants (such as the constants J, K and C explained before) are stored. These constituents are interconnected by a bus line 8.

The control processor 4, addition processor 5 and decision processor 6 are implemented by, for example, a CPU, a ROM, a RAM, and programs stored in the ROM.

The storage register 7 is implemented by, for example, a RAM.

Accordingly, this embodiment may be incorporated as a sub CPU (processing unit) into a serial processing type processor in the prior art. In a case where a planning problem in which the sequence of permutations or a combination pattern affording the optimum value is derived from among an enormous number of permutations or combinations needs to be solved, the sub CPU is started so as to execute a problem solving process. Thus, the sub CPU is prevented to the utmost from executing processes other than the process for obtaining the optimum value, so that the processing performance of the whole system is enhanced.

The present invention has the effect that an expedient capable of forming the optimum plan for a given problem at high speed can be provided with a simple construction.

What is claimed is:

1. A planning system, comprising:

setting means for accepting, at least, a given planning problem, and values of a variable required for solving the problem;

optimization means for creating an objective function which expresses an item intended for either of minimization or maximization in the planning problem, and for forming a plan which affords either of minimum or maximum values of the created objective function; and storage means for storing therein, at least, a preset variable required for forming the plan;

said optimization means including calculation means for calculating a difference value between values of said objective function assumed in a last formed plan and a newly formed plan, and replanning means for comparing the difference value of said objective function with a value of the preset variable in said storage means, and for substituting the last formed plan with the newly formed plan and setting the latter as a candidate for an optimum plan, on condition that said difference value of said objective function is smaller than the value of the preset variable, wherein said value of the preset variable is determined randomly, at each time the plan is formed, within a range which decreases as a number of times of planning increase.

2. A planning system according to claim 1, further comprising:

display means for displaying the processed result of said optimization means.

3. A planning system according to claim 1, wherein said storage means stores therein;

not only said preset variable denoted by $C(i)$ (where letter $i$ denotes a number of time of planning), but also variables $J(i)$ and $K(i)$ which are used for rearraying $J(i)$th to $K(i)$th elements in an arrayal of elements constituting the last formed plan, into a reverse sequence when the newly formed plan is to be formed; the variables $J(i)$ and $K(i)$ satisfying a relation of $J(i)<K(i)$, varying within respective ranges of $1 \leq J(i) \leq n$ and $1 \leq K(i) \leq n$ (where letter $n$ denotes a number of the constituent elements of each of said last formed and newly formed plans), and being uniformly distributed within the respective ranges.

4. A planning system according to claim 3, wherein said preset variable $C(i)$ is set as:

$C(i)=(C_1 \cdot a(i))/\log(i+C_2))$ (where "log" signifies the natural logarithm)

by predetermined constants $C_1$ and $C_2$, and a random number $a(i)$ which is generated each time the plan is formed, and which is uniformly distributed within a range of $0.0 \leq a(i) \leq 1.0$.

5. A planning method for altering a content of a given candidate for a plan so as to minimize or maximize a value of an objective function which expresses an item intended to be minimized or maximized in the plan, comprising the steps of:

altering part of an element arrayal of a permutation in a case where said plan is a permutation problem, and at least one element to-be-selected in a case where said plan is a combination problem; and calculating a difference between values of the objective function assumed before and after the alteration, and setting the new plan after said alteration as a candidate for an optimum plan on condition that the difference is smaller than a random value which is uniformly distributed within a range which decreases gradually each time said plan is altered.

6. A planning system according to claim 1, wherein said optimization means forms said newly formed plan by reversing an order of elements between Jth to Kth elements of the last plan when said plan pertains to a permutation problem.

7. A planning system according to claim 4, wherein said preset variable can be approximated by the following expression: $C(i)=C_1/\log(i+2)$.

* * * * *